United States Patent
Banerjee et al.

(10) Patent No.: US 11,966,336 B2
(45) Date of Patent: Apr. 23, 2024

(54) CACHING DATA BASED ON GREENHOUSE GAS DATA

(71) Applicant: SAP SE, Walldorf (DE)

(72) Inventors: Debashis Banerjee, Bengaluru (IN); Prateek Agarwal, Pune (IN); Kavitha Krishnan, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/521,707

(22) Filed: Nov. 8, 2021

(65) Prior Publication Data

US 2023/0147688 A1    May 11, 2023

(51) Int. Cl.
*G06F 12/0837*    (2016.01)
*G06F 12/0877*    (2016.01)

(52) U.S. Cl.
CPC ...... *G06F 12/0837* (2013.01); *G06F 12/0877* (2013.01)

(58) Field of Classification Search
CPC . G06F 12/0837; G06F 12/0877; G06F 12/121
USPC ........................................................ 711/141
See application file for complete search history.

(56) References Cited

U.S. PATENT DOCUMENTS

| | | | | |
|---|---|---|---|---|
| 7,069,388 B1* | 6/2006 | Greenfield | ............ | G06F 12/128 711/128 |
| 7,742,830 B1* | 6/2010 | Botes | ................... | G06F 9/4893 700/32 |
| 10,902,484 B1* | 1/2021 | Pepere | ................. | G06Q 20/145 |
| 2013/0247059 A1* | 9/2013 | Amsterdam | ........... | G06Q 10/06 718/104 |
| 2014/0316964 A1* | 10/2014 | Slutsker | ................. | G06Q 40/04 705/37 |
| 2014/0379396 A1* | 12/2014 | Schroepfer | ........ | G06Q 10/0631 705/7.12 |
| 2017/0083447 A1* | 3/2017 | Xu | ........................ | G06F 12/123 |
| 2022/0011843 A1* | 1/2022 | MacNamara | ....... | G06F 11/3062 |

FOREIGN PATENT DOCUMENTS

WO    2018227691 A1    12/2018

OTHER PUBLICATIONS

Extended European Search Report for EP Application No. 22193578.6-1224, dated Mar. 24, 2023, 5 pages.

* cited by examiner

*Primary Examiner* — Gautam Sain
*Assistant Examiner* — Wei Ma
(74) *Attorney, Agent, or Firm* — Fountainhead Law Group P.C.

(57) ABSTRACT

Some embodiments provide a program that receives a first set of data and a first greenhouse gas emission value. The program stores, in a cache, the first set of data and the first greenhouse gas emission value. The program receives a second set of data and a second greenhouse gas emission value. The program stores, in the cache, the second set of data and the second greenhouse gas emission value. The program receives a third set of data and a third greenhouse gas emission value. The program determines one of the first and second sets of data to remove from the cache based on the first and second greenhouse gas emission values. The program replaces, in the cache, one of the first and second sets of data and the corresponding first or second greenhouse gas emission value with the third set of data and the third greenhouse gas emission value.

20 Claims, 9 Drawing Sheets

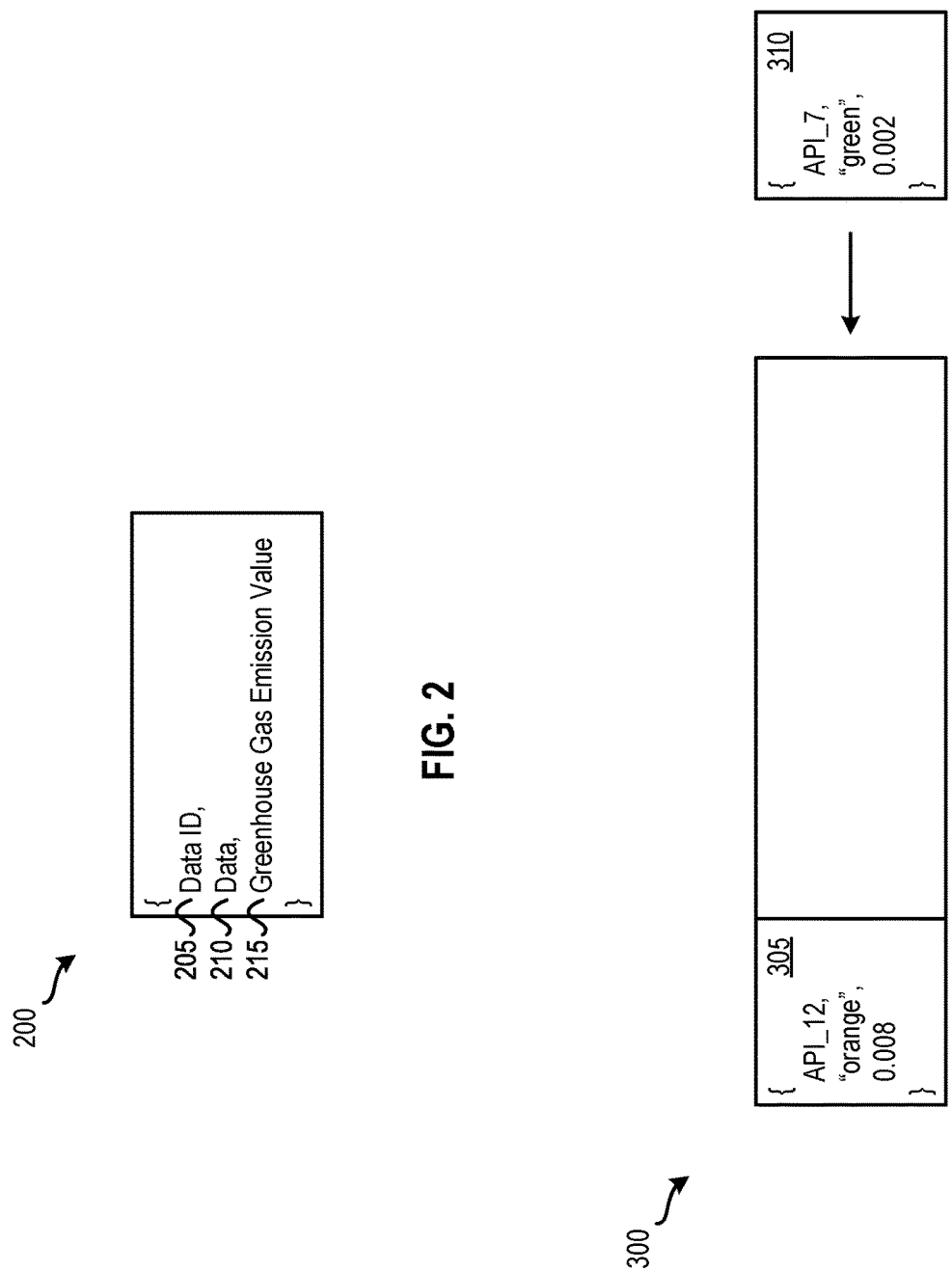

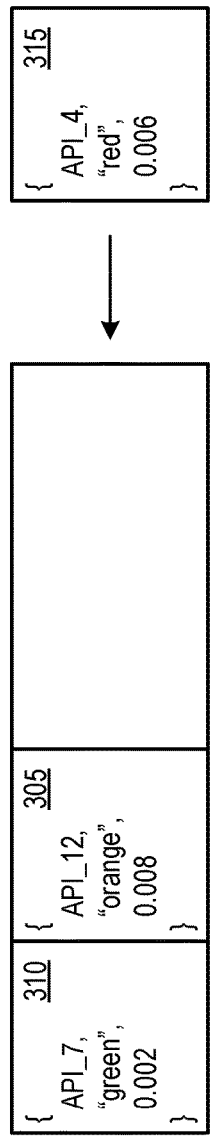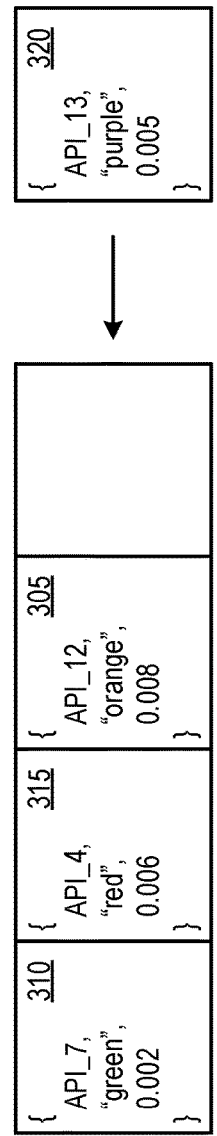
FIG. 3B
FIG. 3C

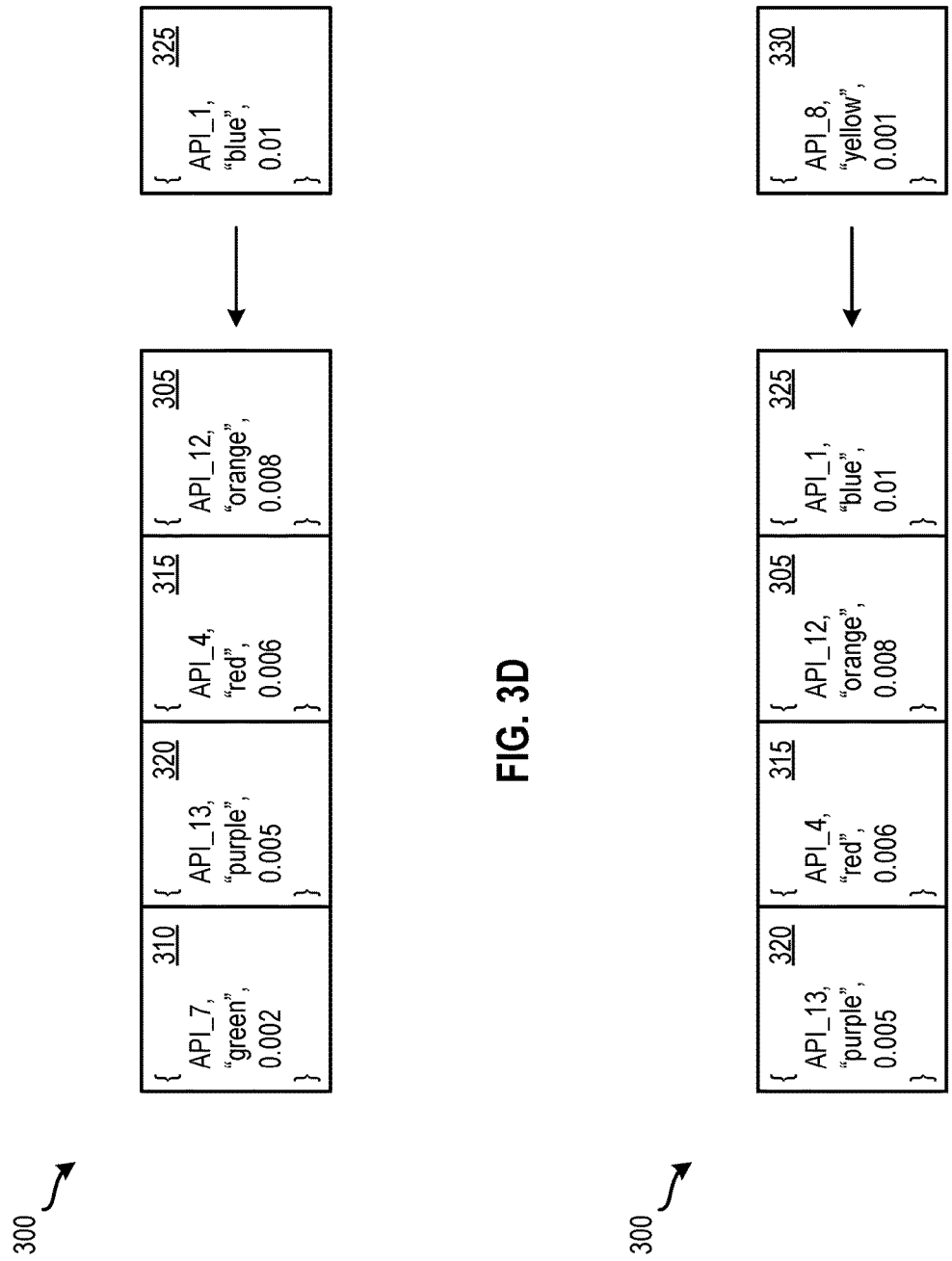

CACHING DATA BASED ON GREENHOUSE GAS DATA

BACKGROUND

Computing devices typically include components (e.g., memory, hard disk drives, solid-state drives, etc.) that are used to store data utilized by the computing devices. Caching is a technique that can be employed to increase the speed at which data is provided to various consumers of data in a computing device. Caching may be implemented in hardware as well as in software. Examples of hardware caches include processor caches, disk caches, etc. Examples of software caches include web browser caches, database caches, etc. Many caching algorithms exist for managing data in a cache. Examples of such algorithms include first in first out (FIFO), last in first out (LIFO), first in last out (FILO), least recently used (LRU), most recently used (MRU), least frequently used (LFU), etc.

SUMMARY

In some embodiments, a non-transitory machine-readable medium stores a program executable by at least one processing unit of a device. The program receives a first set of data and a first greenhouse gas emission value associated with the first set of data. The program further stores, in a cache of the device, the first set of data and the first greenhouse gas emission value. The program also receives a second set of data and a second greenhouse gas emission value associated with the second set of data. The program further stores, in the cache of the device, the second set of data and the second greenhouse gas emission value. The program also receives a third set of data and a third greenhouse gas emission value associated with the third set of data. The program further determines one of the first and second sets of data to remove from the cache of the device based on the first greenhouse gas emission value and the second greenhouse gas emission value. The program also replaces, in the cache of the device, the one of the first and second sets of data and the corresponding first or second greenhouse gas emission value with the third set of data and the third greenhouse gas emission value.

In some embodiments, the program may further send a computing system a request through an application programming interface (API) provided by the computing system. The first set of data and the first greenhouse gas emission value may be received from the computing system in response to the request. The first greenhouse gas emission value may indicate an amount of greenhouse gas emitted by the computing system to process the request and determine the first set of data.

In some embodiments, the program may further receive, through a graphical user interface (GUI), the first greenhouse gas emission value specified for the first set of data and store a mapping between the first greenhouse gas emission value and the first set of data. The program may further send a computing system a request through an application programming interface (API) provided by the computing system, wherein the first set of data is received from the computing system in response to the request, and determine that the first greenhouse gas emission value is associated with the first set of data based on the mapping between the first greenhouse gas emission value and the first set of data.

In some embodiments, determining the one of the first and second sets of data to remove from the cache of the device may include determining one of the first and second gas emission values having a highest value and determining a corresponding set of data in the first and second sets of data as being the one of the first and second sets of data to remove from the cache of the device. The cache of the device may be a memory cache of the device.

In some embodiments, a method, executable by a device, receives a first set of data and a first greenhouse gas emission value associated with the first set of data. The method further stores, in a cache of the device, the first set of data and the first greenhouse gas emission value. The method also receives a second set of data and a second greenhouse gas emission value associated with the second set of data. The method further stores, in the cache of the device, the second set of data and the second greenhouse gas emission value. The method also receives a third set of data and a third greenhouse gas emission value associated with the third set of data. The method further determines one of the first and second sets of data to remove from the cache of the device based on the first greenhouse gas emission value and the second greenhouse gas emission value. The method also replaces, in the cache of the device, the one of the first and second sets of data and the corresponding first or second greenhouse gas emission value with the third set of data and the third greenhouse gas emission value.

In some embodiments, the method may further send a computing system a request through an application programming interface (API) provided by the computing system. The first set of data and the first greenhouse gas emission value may be received from the computing system in response to the request. The first greenhouse gas emission value may indicate an amount of greenhouse gas emitted by the computing system to process the request and determine the first set of data.

In some embodiments, the method may further receive, through a graphical user interface (GUI), the first greenhouse gas emission value specified for the first set of data and store a mapping between the first greenhouse gas emission value and the first set of data. The method may further send a computing system a request through an application programming interface (API) provided by the computing system, wherein the first set of data is received from the computing system in response to the request, and determine that the first greenhouse gas emission value is associated with the first set of data based on the mapping between the first greenhouse gas emission value and the first set of data.

In some embodiments, determining the one of the first and second sets of data to remove from the cache of the device may include determining one of the first and second gas emission values having a highest value and determining a corresponding set of data in the first and second sets of data as being the one of the first and second sets of data to remove from the cache of the device. The cache of the device may be a memory cache of the device.

In some embodiments, a system includes a set of processing units and a non-transitory machine-readable medium that stores instructions. The instructions cause at least one processing unit to receive a first set of data and a first greenhouse gas emission value associated with the first set of data. The instructions further cause the at least one processing unit to store, in a cache of the system, the first set of data and the first greenhouse gas emission value. The instructions also cause the at least one processing unit to receive a second set of data and a second greenhouse gas emission value associated with the second set of data. The instructions further cause the at least one processing unit to store, in the cache of the system, the second set of data and the second greenhouse gas emission value. The instructions also cause the at least one processing unit to receive a third set of data and a third greenhouse gas emission value associated with the third set of data. The instructions further cause the at least one processing unit to determine one of the first and second sets of data to remove from the cache of the system based on the first greenhouse gas emission value and the second greenhouse gas emission value. The instructions also cause the at least one processing unit to replace, in the cache of the system, the one of the first and second sets of data and the corresponding first or second greenhouse gas emission value with the third set of data and the third greenhouse gas emission value.

In some embodiments, the instructions may further cause the at least one processing unit to send a computing system a request through an application programming interface (API) provided by the computing system. The first set of data and the first greenhouse gas emission value may be received from the computing system in response to the request. The first greenhouse gas emission value may indicate an amount of greenhouse gas emitted by the computing system to process the request and determine the first set of data.

In some embodiments, the instructions may further cause the at least one processing unit to receive, through a graphical user interface (GUI), the first greenhouse gas emission value specified for the first set of data and store a mapping between the first greenhouse gas emission value and the first set of data. The instructions may further cause the at least one processing unit to send a computing system a request through an application programming interface (API) provided by the computing system, wherein the first set of data is received from the computing system in response to the request, and determine that the first greenhouse gas emission value is associated with the first set of data based on the mapping between the first greenhouse gas emission value and the first set of data. Determining the one of the first and second sets of data to remove from the cache of the device may include determining one of the first and second gas emission values having a highest value and determining a corresponding set of data in the first and second sets of data as being the one of the first and second sets of data to remove from the cache of the device.

The following detailed description and accompanying drawings provide a better understanding of the nature and advantages of various embodiments of the present disclosure.

BRIEF DESCRIPTION OF THE DRAWINGS

FIG. 2 illustrates an example data structure for a cache entry stored in a cache according to some embodiments.

FIGS. 3A-3F illustrate an example of managing data for a cache based on greenhouse data according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for caching data based on greenhouse gas data. In some embodiments, a first computing system that is configured to cache data based on greenhouse gas data. For example, the first computing system may call an application programming interface (API) provided by a second computing system. In response to the API call, the first computing system can receive a set of data from the second computing system. In some cases, the first computing system may also receive a greenhouse gas emission value from the second computing system. In other cases, a user of a client device has defined a greenhouse gas emission value associated with the set of data. Regardless of where the greenhouse gas emission value comes from, the first computing system stores the set of data and the greenhouse gas emission value in a cache. The first computing system may continue to cache data that has an associated greenhouse gas emission value in this manner. When the first computing system is caching a particular set of data and its associated greenhouse gas emission value and the cache is full, the first computing system can determine a cache entry in the cache to replace with the particular set of data and its associated greenhouse gas emission value based on the greenhouse gas emission values of the cache entries currently stored in the cache. The first computing system may replace the determined cache entry in the cache with the particular set of data and its associated greenhouse gas emission value.

Figure 1:
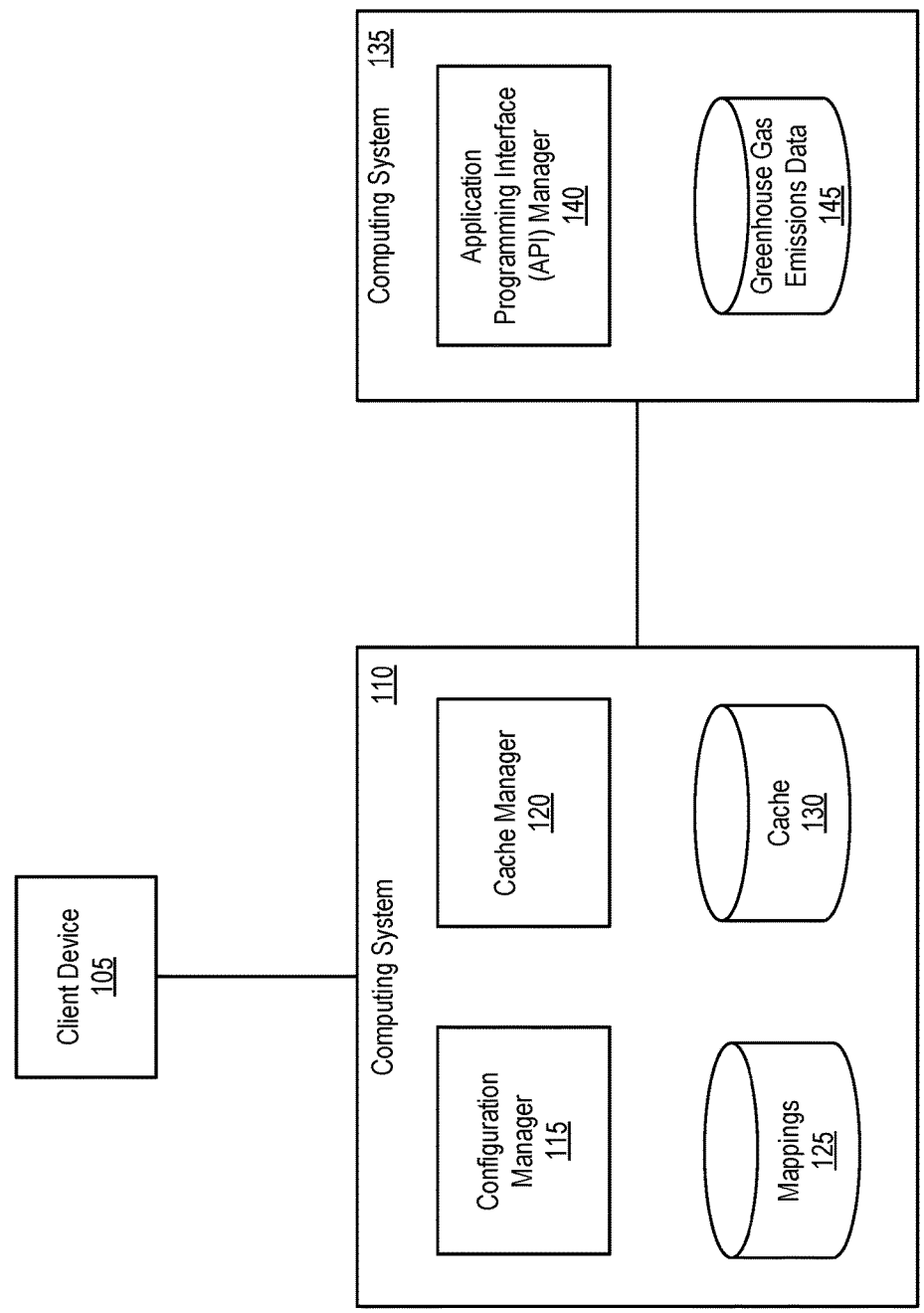
FIG. 1 illustrates a system for caching data based on greenhouse gas data according to some embodiments.

FIG. 1 illustrates a system 100 for caching data based on greenhouse gas data according to some embodiments. As shown, system 100 includes client device 105, computing system 110, and computing system 135. Client device 105 may communicate and interact with computing system 110. For example, a user of client device 105 can access (e.g., via a graphical user interface (GUI) provided by computing system 110) computing system 110 to specify different greenhouse gas emission values for different sets of data. In some embodiments, a data identifier (ID) may be used to identify a particular set of data. In some such embodiments, a user of client device 105 may specify a greenhouse gas emission value for a particular set of data by specifying the greenhouse gas emission value for a data ID identifying the particular set of data.

As depicted in FIG. 1, computing system 110 includes configuration manager 115, cache manager 120, mappings storage 125, and cache storage 130. Mapping storage 125 is configured to store mappings between sets of data and greenhouse gas emission values. In some embodiments, a greenhouse gas emission value (e.g., a carbon dioxide emission value, a nitrous oxide emission value, a methane emission value, etc.) indicates an amount of greenhouse gas (e.g., in terms of tons of the greenhouse gas) emitted to produce a corresponding set of data. Cache storage 130 can stores caches for caching sets of data. In some embodiments, storages 125 and 130 are implemented in a single physical storage while, in other embodiments, storages 125 and 130 may be implemented across several physical storages. While FIG. 1 shows storages 125 and 130 as part of computing system 110, one of ordinary skill in the art will appreciate that mappings storage 125 and/or cache storage 130 may be external to computing system 110 in some embodiments.

Configuration manager 115 is responsible for managing configuration settings for computing system 110. For instance, configuration manager 115 can provide a graphical user interface (GUI) for receiving different greenhouse gas emission values specified for different sets of data. Through such a GUI, configuration manager 115 may receive a greenhouse gas emission value specified for a particular set of data. In response to receiving the greenhouse gas emission value, configuration manager 115 stores a mapping between the greenhouse gas emission value and the particular set of data (e.g., a data ID identifying the particular set of data).

Cache manager 120 is configured to manage data for caches stored in cache storage 130. For example, when cache manager 120 receives a set of data and a greenhouse gas emission value to be cached in a particular cache, cache manager 120 caches the set of data and the greenhouse gas emission value in the particular cache stored in cache storage 130 based on the greenhouse gas emission values associated with the sets of data stored in the particular cache. Details of a data caching example will be described below. FIG. 2 illustrates an example data structure 200 for a cache entry stored in a cache according to some embodiments. As shown, data structure 200 includes three attributes 205-215. Attribute 205 is configured to store a data ID for identify the set of data stored in attribute 210. Attribute 210 stores a set of data. Attribute 215 is configured to store a greenhouse gas emission value.

Returning to FIG. 1, computing system 135 includes application programming interface (API) manager 140 and greenhouse gas emission data storage 145. Greenhouse gas emission data storage 145 stores different greenhouse gas emission values for different sets of data produced from executing different API requests. API manager 140 is responsible for managing API requests for APIs provided by computing system 135. For instance, API manager 140 can receive an API request from computing system 110. In response to the request, API manager 140 executes the corresponding API, which causes the API to generate a set of data. Next, API manager 140 sends computing system 110a response to the API request that includes the set of data.

Figure 3F:
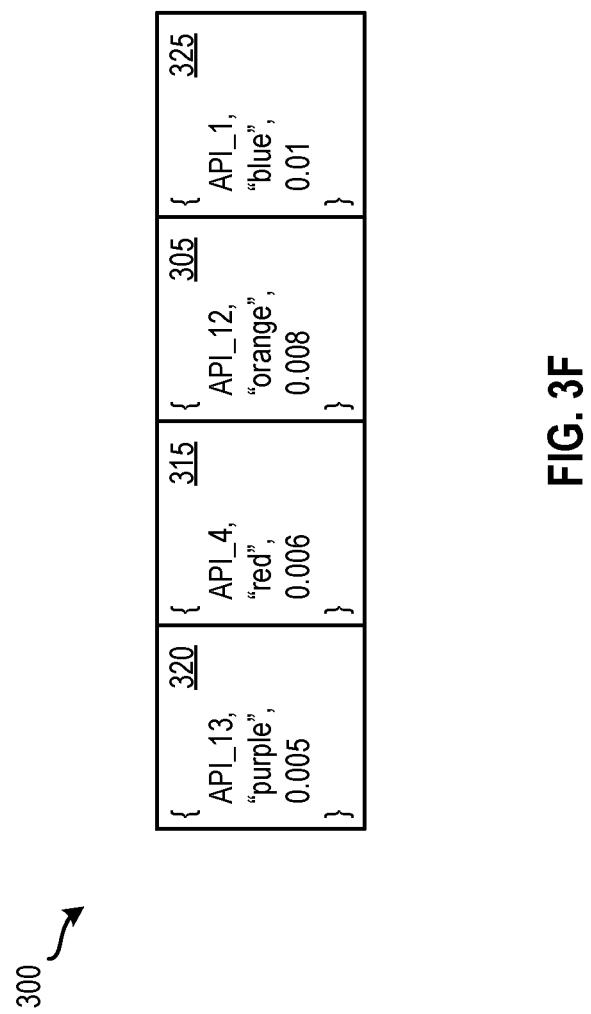

An example data caching operation will now be described by reference to FIGS. 3A-3F. FIGS. 3A-3F illustrate an example of managing data for a cache 300 based on greenhouse data according to some embodiments. For this example, cache 300 is stored in cache storage 130 and cache entries stored in cache 300 are stored according to data structure 200. The example operation begins with computing system 110 sending API manager 140 a request through an API called API_12. In response to the request, API manager 140 executes API_12, which generates a string value of "orange." Then, API manager 140 sends computing system 110 the string "orange" and an associated greenhouse gas emission value 0.008. When computing system 110 receives the data, computing system 110 sends cache manager 120 the data as well as name of the API (API_12 in this example). Next, cache manager 120 generates a cache entry that includes a data ID of API_12, a set of data that includes the string "orange," and a greenhouse gas emission value of 0.008. As shown in FIG. 3A, cache 300 includes cache entry 305, which is the cache entry generated by cache manager 120. Cache entry 305 includes a data ID of API_12, a set of data that includes the string "orange," and a greenhouse gas emission value of 0.008. Here, cache manager 120 has stored cache entry 305 in cache 300.

The example operation continues by computing system 110 sending API manager 140 a request via an API called API_7. Upon receiving the request, API manager 140 executes API_7, which generates a string of "green." API manager 140 sends computing system 110 the string "green" and an associated greenhouse gas emission value 0.002 that API manager 140 retrieves from greenhouse gas emissions data storage 145. Once computing system 110 receives the data from API manager 140, computing system 110 sends cache manager 120 the data and the name of the API (API_7 in this example). Next, cache manager 120 generates a cache entry that includes a data ID of API_7, a set of data that includes the string "green," and a greenhouse gas emission value of 0.002. FIG. 3A also illustrates that cache entry 310 is to be cached in cache 300. As shown, cache entry 310, which is generated by cache manager 120, includes a data ID of API_12, a set of data that includes the string "green," and a greenhouse gas emission value of 0.002.

FIG. 3B illustrates cache 300 after cache manager 120 caches cache entry 310. In this example, cache manager 120 stores cache entry 310 in cache 300 based on the greenhouse gas emission values of cache entries 305 and 310. In particular, cache manager 120 caches cache entry 310 in cache 300 so that the cache entries in cache 300 are ordered based on the greenhouse gas emission values from smallest to largest (smallest on the left and largest on the right in this example). Here, cache entry 310 has a smaller greenhouse gas emission value than cache entry 305. Thus, cache entry 310 is depicted as being on the left of cache entry 305 in FIG. 3B.

Continuing with the example operation, computing system 110 sends API manager 140 a request via an API called API_4. When API manager 140 receives the request, API manager 140 executes API_4, which generates a string of "red." Then, API manager 140 sends computing system 110 the string "red" and an associated greenhouse gas emission value 0.006 that API manager 140 retrieves from greenhouse gas emissions data storage 145. Upon receiving the data from API manager 140, computing system 110 sends cache manager 120 the string, the associated greenhouse gas emission value, and the name of the API (API_4 in this example). Cache manager 120 then generates a cache entry that includes a data ID of API, a set of data that includes the string "red," and a greenhouse gas emission value of 0.006. FIG. 3B further shows that cache entry 315 is to be cached in cache 300. As depicted in FIG. 3B, cache entry 315, which is generated by cache manager 120, includes a data ID of API_4, a set of data that includes the string "red," and a greenhouse gas emission value of 0.006.

FIG. 3C illustrates cache 300 after cache manager 120 caches cache entry 315. For this example, cache manager 120 stores cache entry 315 in cache 300 based on the greenhouse gas emission values of cache entries 305-315. Specifically, cache manager 120 caches cache entry 315 in cache 300 so that the cache entries in cache 300 are ordered based on the greenhouse gas emission values from smallest to largest (smallest on the left and largest on the right in this example). In this example, cache entry 315 has a smaller greenhouse gas emission value than cache entry 305 but a larger greenhouse gas emission value than cache entry 310. Therefore, cache entry 315 is shown as being on the left of cache entry 305 and to the right of cache entry 310.

The example operation continues by computing system 110 sending API manager 140 a request via an API called API_13. In response to the request, API manager 140 executes API_13, which generates a string of "purple." Next, API manager 140 sends computing system 110 the string "purple" and an associated greenhouse gas emission value 0.005 that API manager 140 retrieves from greenhouse gas emissions data storage 145. When computing system 110 receives the data from API manager 140, computing system 110 sends cache manager 120 the string, the associated greenhouse gas emission value, and the name of the API (API_13 in this example). Then, cache manager 120 generates a cache entry that includes a data ID of API, a set of data that includes the string "purple," and a greenhouse gas emission value of 0.005. FIG. 3C also illustrates that cache entry 320 is to be cached in cache 300. As shown, cache entry 320, which is generated by cache manager 120, includes a data ID of API_13, a set of data that includes the string "purple," and a greenhouse gas emission value of 0.005.

FIG. 3D illustrates cache 300 after cache manager 120 caches cache entry 320. Here, cache manager 120 stores cache entry 320 in cache 300 based on the greenhouse gas emission values of cache entries 305-320. In particular, cache manager 120 caches cache entry 320 in cache 300 so that the cache entries in cache 300 are ordered based on the greenhouse gas emission values from smallest to largest (smallest on the left and largest on the right in this example). For this example, cache entry 320 has a smaller greenhouse gas emission value than cache entries 315 and 305 but a larger greenhouse gas emission value than cache entry 310. Hence, cache entry 320 is depicted as being on the left of cache entry 315 and to the right of cache entry 310.

Continuing with the example operation, computing system 110 sends API manager 140 a request via an API called API_1. Upon receiving the request, API manager 140 executes API_1, which generates a string of "blue." API manager 140 then sends computing system 110 the string "blue" and an associated greenhouse gas emission value 0.01 that API manager 140 retrieves from greenhouse gas emissions data storage 145. Once computing system 110 receives the data from API manager 140, computing system 110 sends cache manager 120 the string, the associated greenhouse gas emission value, and the name of the API (API_1 in this example). Next, cache manager 120 generates a cache entry that includes a data ID of API, a set of data that includes the string "blue," and a greenhouse gas emission value of 0.01. FIG. 3D further shows that cache entry 325 is to be cached in cache 300. As illustrated in FIG. 3D, cache entry 325, which is generated by cache manager 120, includes a data ID of API_1, a set of data that includes the string "blue," and a greenhouse gas emission value of 0.01.

FIG. 3E illustrates cache 300 after cache manager 120 caches cache entry 325. In this example, cache manager 120 stores cache entry 325 in cache 300 based on the greenhouse gas emission values of cache entries 305-325. As shown, cache 300 is currently full of cache entries. Thus, cache manager 120 determines how to process cache entry 325. Here, cache manager 120 determines the cache entry among cache entries 305-325 having the smallest greenhouse gas emission value. If the determined cache entry is cache entry 325, then cache manager 120 drops cache entry 325. Otherwise, cache manager 120 replaces the determined cache entry with cache entry 325 in a manner that maintains the order of the cache entries from smallest to largest. For this example, cache manager 120 determines that cache entry 310 has the smallest greenhouse gas emission value among cache entries 305-325. As such, cache manager 120 replaces cache entry 310 with cache entry 325. Since cache entry 325 has the largest greenhouse gas emission value, it is depicted in the right-most position in cache 300 in FIG. 3E.

The example operation continues by computing system 110 sending API manager 140 a request via an API called API_8. Upon receiving the request, API manager 140 executes API_8, which generates a string of "yellow." Then, API manager 140 sends computing system 110 the string "yellow" and an associated greenhouse gas emission value 0.001 that API manager 140 retrieves from greenhouse gas emissions data storage 145. Upon receiving the data from API manager 140, computing system 110 sends cache manager 120 the string, the associated greenhouse gas emission value, and the name of the API (API_8 in this example). Next, cache manager 120 generates a cache entry that includes a data ID of API, a set of data that includes the string "yellow," and a greenhouse gas emission value of 0.001. FIG. 3E further depicts that cache entry 330 is to be cached in cache 300. As illustrated in FIG. 3E, cache entry 330, which is generated by cache manager 120, includes a data ID of API_8, a set of data that includes the string "yellow," and a greenhouse gas emission value of 0.001.

FIG. 3F illustrates cache 300 after cache manager 120 caches cache entry 330. For this example, cache manager 120 stores cache entry 330 in cache 300 based on the greenhouse gas emission values of cache entries 305-330. As illustrated, cache 300 is currently full of cache entries. Hence, cache manager 120 determines how to process cache entry 330. In this example, cache manager 120 determines the cache entry among cache entries 305-330 having the smallest greenhouse gas emission value. If the determined cache entry is cache entry 330, then cache manager 120 drops cache entry 330. If the determined cache entry is not cache entry 330, cache manager 120 replaces the determined cache entry with cache entry 330 in a manner that maintains the order of the cache entries from smallest to largest. Here, cache manager 120 determines that cache entry 330 has the smallest greenhouse gas emission value among cache entries 305-330. Accordingly, cache manager 120 drops cache entry 330. As shown, the same cache entries 305-320 are still stored in cache 300.

Figure 4:
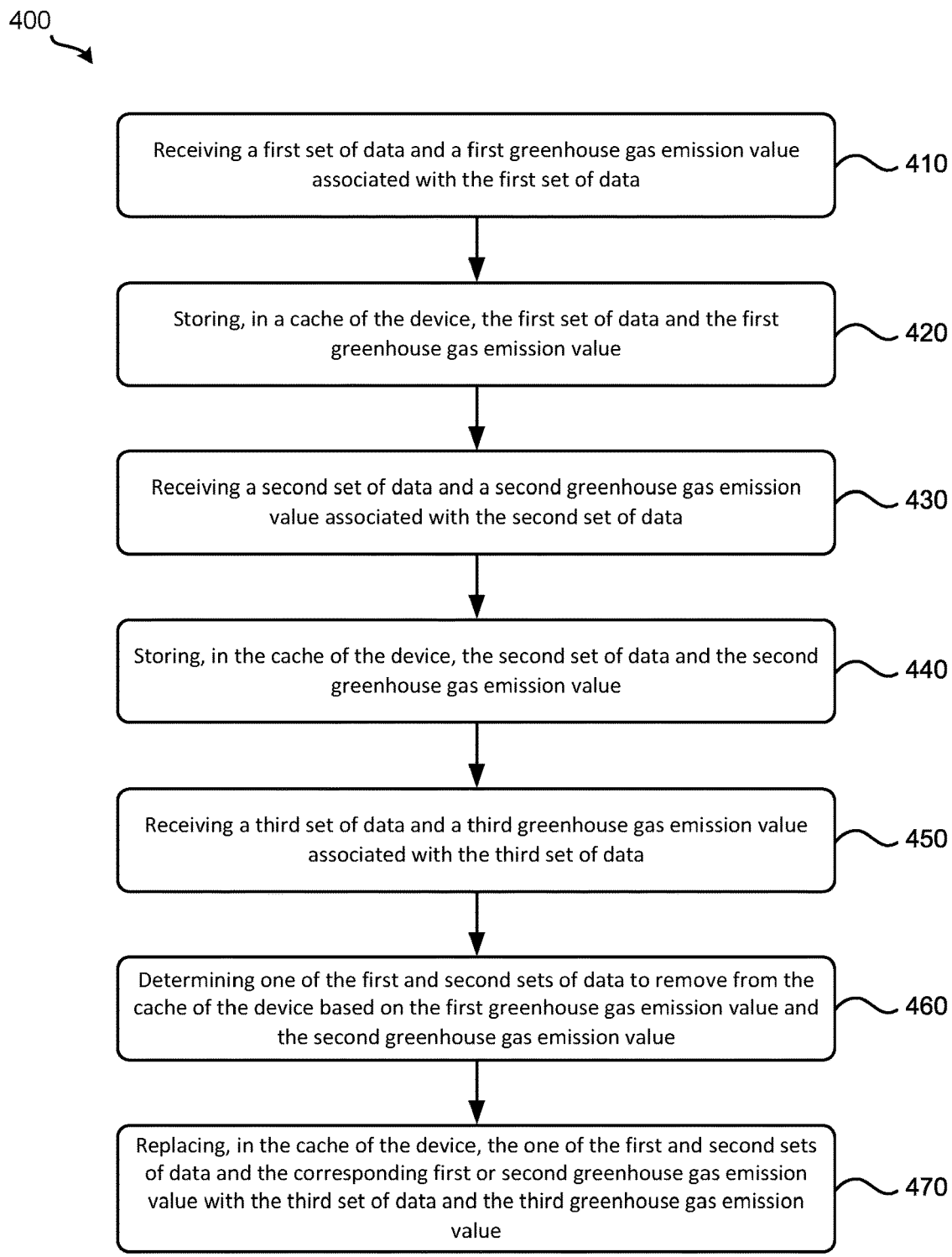
FIG. 4 illustrates a process for caching data based on greenhouse gas data according to some embodiments.

FIG. 4 illustrates a process 400 for caching data based on greenhouse gas data according to some embodiments. In some embodiments, computing system 110 performs process 400. Process 400 begins by receiving, at 410 a first set of data and a first greenhouse gas emission value associated with the first set of data. Referring to FIGS. 1 and 3B, computing system 110 can receive from API manager 140 the string "red" and an associated greenhouse gas emission value 0.006.

Next, process 400 stores, at 420, in a cache of the device, the first set of data and the first greenhouse gas emission value. Referring to FIGS. 1 and 3C as an example, cache manager 120 stores cache entry 315, which includes the string "red" and an associated greenhouse gas emission value 0.006, in cache 300. Process 400 then receives, at 430, a second set of data and a second greenhouse gas emission value associated with the second set of data. Referring to FIGS. 1 and 3C, computing system 110 may receive from API manager 140 the string "purple" and an associated greenhouse gas emission value 0.005.

At 440, process 400 stores, in the cache of the device, the second set of data and the second greenhouse gas emission value. Referring to FIGS. 1 and 3D as an example, cache manager 120 stores cache entry 320, which includes the string "purple" and an associated greenhouse gas emission value 0.005, in cache 300. Then, process 400 receives, at 450, a third set of data and a third greenhouse gas emission value associated with the third set of data. Referring to FIGS. 1 and 3D, computing system 110 may receive from API manager 140 the string "blue" and an associated greenhouse gas emission value 0.01.

Next, process 400 determines, at 460, one of the first and second sets of data to remove from the cache of the device based on the first greenhouse gas emission value and the second greenhouse gas emission value. Referring to FIGS. 1 and 3E as an example, cache manager 120 determines how to process cache entry 325 by determining the cache entry among cache entries 305-325 having the smallest greenhouse gas emission value.

Finally, process 400 replaces, at 470, in the cache of the device, the one of the first and second sets of data and the corresponding first or second greenhouse gas emission value with the third set of data and the third greenhouse gas emission value. Referring to FIGS. 1 and 3E as an example, if the determined cache entry is cache entry 325, cache manager 120 drops cache entry 325. Otherwise, cache manager 120 replaces the determined cache entry with cache entry 325 in a manner that maintains the order of the cache entries from smallest to largest. Here, cache manager 120 determines that cache entry 310 has the smallest greenhouse gas emission value among cache entries 305-325 cache manager 120 replaces cache entry 310 with cache entry 325, which includes the string "blue" and an associated greenhouse gas emission value 0.01, in cache 300.

The examples described above by reference to FIGS. 1-4 show a technique for caching data based on greenhouse gas emission values. One of ordinary skill in the art will appreciate that such a technique can be applied to any type of caching mechanism. For example, the data caching technique may be applied to any types of software caches (e.g., database/database management system (DBMS) caching, web caching, etc.) as well as any types of hardware caches (e.g., processor memory caching (e.g., L2 memory caching, L3 memory caching, L4 memory caching, etc.), page/disk caching, etc.).

Figure 5:
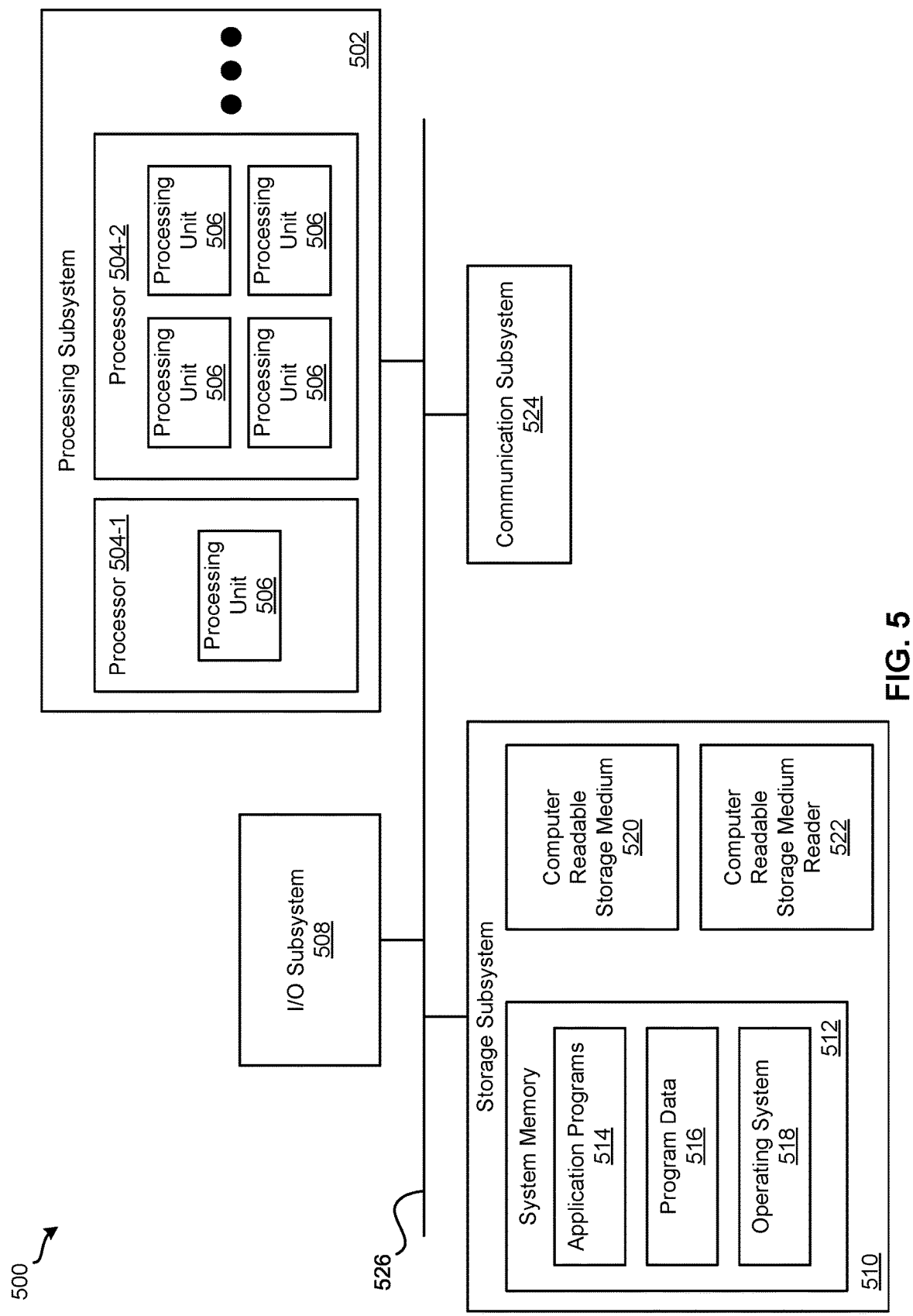
FIG. 5 illustrates an exemplary computer system, in which various embodiments may be implemented.

FIG. 5 illustrates an exemplary computer system 500 for implementing various embodiments described above. For example, computer system 500 may be used to implement client device 105, computing system 110, and computing system 135. Computer system 500 may be a desktop computer, a laptop, a server computer, or any other type of computer system or combination thereof. Some or all elements of configuration manager 115, cache manager 120, API manager 140, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514, program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., configuration manager 115, cache manager 120, and API manager 140) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
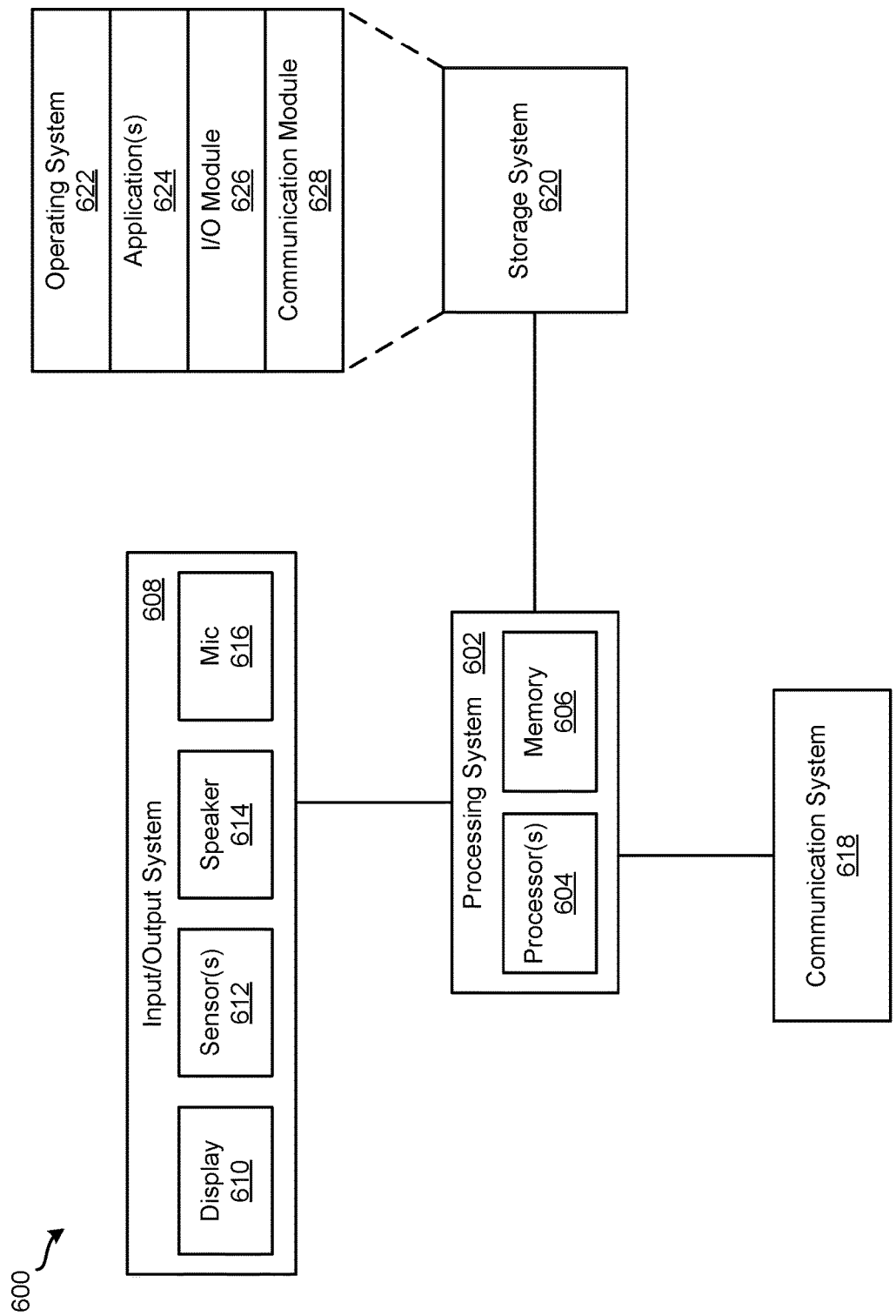
FIG. 6 illustrates an exemplary computing device, in which various embodiments may be implemented.

FIG. 6 illustrates an exemplary computing device 600 for implementing various embodiments described above. For example, computing device 600 may be used to implement client device 105. Computing device 600 may be a cellphone, a smartphone, a wearable device, an activity tracker or manager, a tablet, a personal digital assistant (PDA), a media player, or any other type of mobile computing device or combination thereof. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
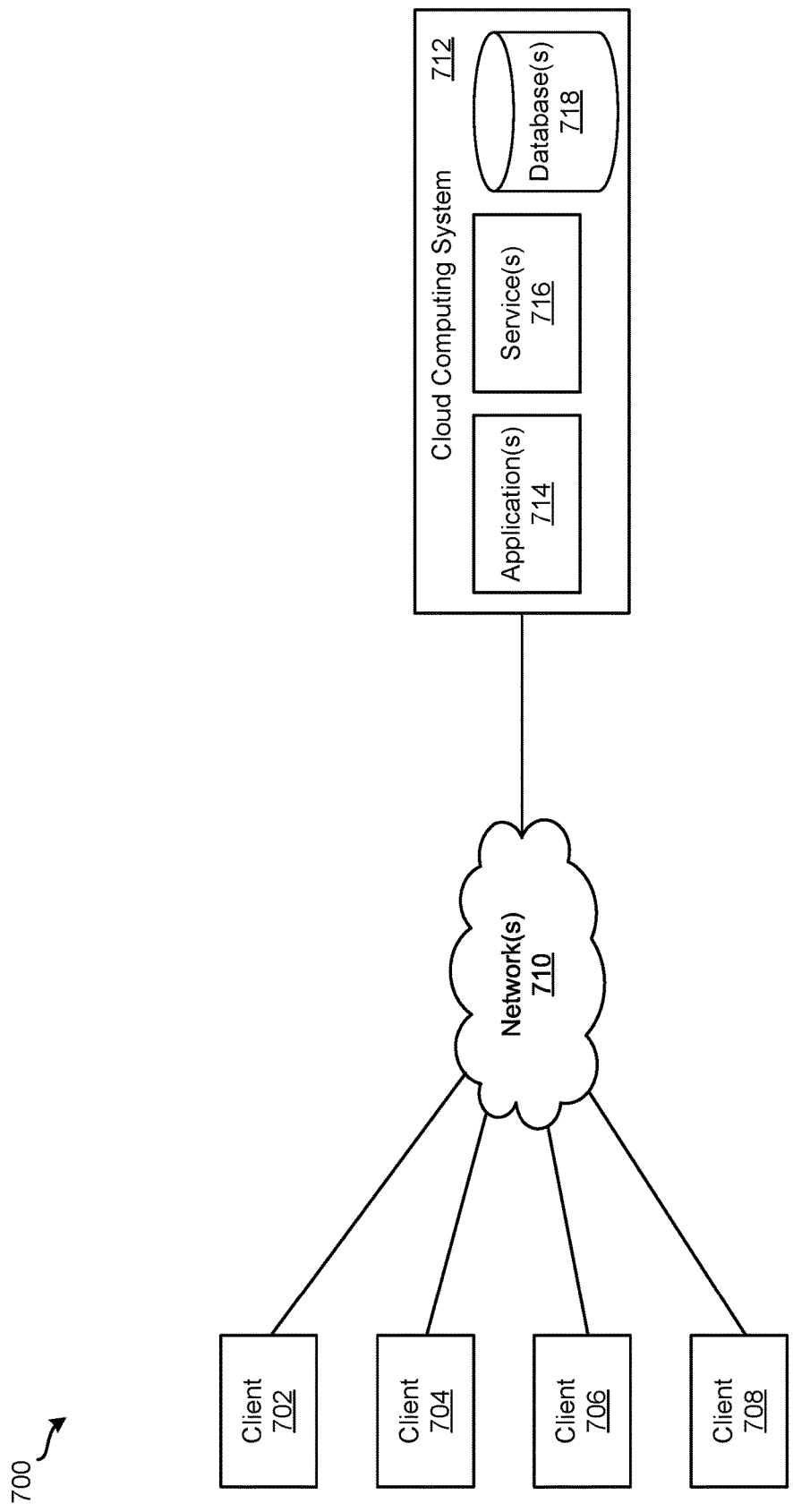
FIG. 7 illustrates an exemplary system, in which various embodiments may be implemented.

FIG. 7 illustrates an exemplary system 700 for implementing various embodiments described above. For example, one of the client devices 702-708 may be used to implement client device 105 and cloud computing system may be used to implement computing system 110 and computing system 135. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 712 is referred to as a "cloud service." Typically, servers and systems that make up cloud computing system 712 are different from the on-premises servers and systems of a customer. For example, cloud computing system 712 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, storages 125, 130, and 145 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
   receiving a first set of data and a first greenhouse gas emission value associated with the first set of data, wherein the first greenhouse gas emission value indicates a first amount of greenhouse gas emitted to produce the first set of data;
   storing, in a cache of the device, the first set of data and the first greenhouse gas emission value;
   receiving a second set of data and a second greenhouse gas emission value associated with the second set of data, wherein the second greenhouse gas emission value indicates a second amount of greenhouse gas emitted to produce the second set of data;
   storing, in the cache of the device, the second set of data and the second greenhouse gas emission value;
   receiving a third set of data and a third greenhouse gas emission value associated with the third set of data, wherein the third greenhouse gas emission value indicates a third amount of greenhouse gas emitted to produce the third set of data;
   determining one of the first and second sets of data to remove from the cache of the device based on the first greenhouse gas emission value and the second greenhouse gas emission value; and
   replacing, in the cache of the device, the one of the first and second sets of data and the corresponding first or second greenhouse gas emission value with the third set of data and the third greenhouse gas emission value.

2. The non-transitory machine-readable medium of claim 1, wherein the program further comprises a set of instructions for sending a computing system a request through an application programming interface (API) provided by the computing system, wherein receiving the first set of data and the first greenhouse gas emission value comprises receiving the first set of data and the first greenhouse gas emission value from the computing system in response to the request.

3. The non-transitory machine-readable medium of claim 2, wherein the first greenhouse gas emission value indicates the first amount of greenhouse gas emitted by the computing system when the computing system processes the request and determines the first set of data.

4. The non-transitory machine-readable medium of claim 1, wherein the program further comprises sets of instructions for:
   receiving, from a client device and through a graphical user interface (GUI) provided by the device, the first greenhouse gas emission value specified for the first set of data; and
   storing a mapping between the first greenhouse gas emission value and the first set of data.

5. The non-transitory machine-readable medium of claim 4, wherein the program further comprises sets of instructions for:

sending a computing system a request through an application programming interface (API) provided by the computing system, wherein receiving the first set of data comprises receiving the first set of data from the computing system in response to the request; and determining that the first greenhouse gas emission value is associated with the first set of data based on the mapping between the first greenhouse gas emission value and the first set of data.

6. The non-transitory machine-readable medium of claim 1, wherein determining the one of the first and second sets of data to remove from the cache of the device comprises:

determining one of the first and second gas emission values having a highest value; and determining a corresponding set of data in the first and second sets of data as being the one of the first and second sets of data to remove from the cache of the device.

7. The non-transitory machine-readable medium of claim 1, wherein the cache of the device is a memory cache of the device.

8. A method, executable by a device, comprising:

receiving a first set of data and a first greenhouse gas emission value associated with the first set of data, wherein the first greenhouse gas emission value indicates a first amount of greenhouse gas emitted to produce the first set of data;

storing, in a cache of the device, the first set of data and the first greenhouse gas emission value;

receiving a second set of data and a second greenhouse gas emission value associated with the second set of data, wherein the second greenhouse gas emission value indicates a second amount of greenhouse gas emitted to produce the second set of data;

storing, in the cache of the device, the second set of data and the second greenhouse gas emission value;

receiving a third set of data and a third greenhouse gas emission value associated with the third set of data, wherein the third greenhouse gas emission value indicates a third amount of greenhouse gas emitted to produce the third set of data;

determining one of the first and second sets of data to remove from the cache of the device based on the first greenhouse gas emission value and the second greenhouse gas emission value; and replacing, in the cache of the device, the one of the first and second sets of data and the corresponding first or second greenhouse gas emission value with the third set of data and the third greenhouse gas emission value.

9. The method of claim 8 further comprising sending a computing system a request through an application programming interface (API) provided by the computing system, wherein receiving the first set of data and the first greenhouse gas emission value comprises receiving the first set of data and the first greenhouse gas emission value from the computing system in response to the request.

10. The method of claim 9, wherein the first greenhouse gas emission value indicates the first amount of greenhouse gas emitted by the computing system when the computing system processes the request and determines the first set of data.

11. The method of claim 8 further comprising:

receiving, from a client device and through a graphical user interface (GUI) provided by the device, the first greenhouse gas emission value specified for the first set of data; and storing a mapping between the first greenhouse gas emission value and the first set of data.

12. The method of claim 11 further comprising:

sending a computing system a request through an application programming interface (API) provided by the computing system, wherein receiving the first set of data comprises receiving the first set of data from the computing system in response to the request; and determining that the first greenhouse gas emission value is associated with the first set of data based on the mapping between the first greenhouse gas emission value and the first set of data.

13. The method of claim 8, wherein determining the one of the first and second sets of data to remove from the cache of the device comprises:

determining one of the first and second gas emission values having a highest value; and determining a corresponding set of data in the first and second sets of data as being the one of the first and second sets of data to remove from the cache of the device.

14. The method of claim 8, wherein the cache of the device is a memory cache of the device.

15. A system comprising:

a set of processing units; and a non-transitory machine-readable medium storing instructions that when executed by at least one processing unit in the set of processing units cause the at least one processing unit to:

receive a first set of data and a first greenhouse gas emission value associated with the first set of data, wherein the first greenhouse gas emission value indicates a first amount of greenhouse gas emitted to produce the first set of data;

store, in a cache of the system, the first set of data and the first greenhouse gas emission value;

receive a second set of data and a second greenhouse gas emission value associated with the second set of data, wherein the second greenhouse gas emission value indicates a second amount of greenhouse gas emitted to produce the second set of data;

store, in the cache of the system, the second set of data and the second greenhouse gas emission value;

receive a third set of data and a third greenhouse gas emission value associated with the third set of data, wherein the third greenhouse gas emission value indicates a third amount of greenhouse gas emitted to produce the third set of data;

determine one of the first and second sets of data to remove from the cache of the system based on the first greenhouse gas emission value and the second greenhouse gas emission value; and replace, in the cache of the system, the one of the first and second sets of data and the corresponding first or second greenhouse gas emission value with the third set of data and the third greenhouse gas emission value.

16. The system of claim 15, wherein the instructions further cause the at least one processing unit to send a computing system a request through an application programming interface (API) provided by the computing system, wherein receiving the first set of data and the first greenhouse gas emission value comprises receiving the first set of data and the first greenhouse gas emission value from the computing system in response to the request.

17. The system of claim 16, wherein the first greenhouse gas emission value indicates the first amount of greenhouse gas emitted by the computing system when the computing system processes the request and determines the first set of data.

18. The system of claim 15, wherein the instructions further cause the at least one processing unit to:
  receive, from a client device and through a graphical user interface (GUI) provided by the system, the first greenhouse gas emission value specified for the first set of data; and
  store a mapping between the first greenhouse gas emission value and the first set of data.

19. The system of claim 18, wherein the instructions further cause the at least one processing unit to:
  send a computing system a request through an application programming interface (API) provided by the computing system, wherein receiving the first set of data comprises receiving the first set of data from the computing system in response to the request; and
  determine that the first greenhouse gas emission value is associated with the first set of data based on the mapping between the first greenhouse gas emission value and the first set of data.

20. The system of claim 15, wherein determining the one of the first and second sets of data to remove from the cache of the device comprises:
  determining one of the first and second gas emission values having a highest value; and
  determining a corresponding set of data in the first and second sets of data as being the one of the first and second sets of data to remove from the cache of the device.

* * * * *